(12) United States Patent
Frisbie et al.

(10) Patent No.: US 8,404,025 B2
(45) Date of Patent: Mar. 26, 2013

(54) SYSTEMS AND METHODS FOR BIOMETHANE CLEANING AND DISTRIBUTION

(75) Inventors: Kenneth J. Frisbie, Encinitas, CA (US); Frank J. Mazanec, Encinitas, CA (US)

(73) Assignee: Biofuels Energy, LLC, Encinitas, CA (US)

( * ) Notice: Subject to any disclaimer, the term of this patent is extended or adjusted under 35 U.S.C. 154(b) by 778 days.

(21) Appl. No.: 12/617,508

(22) Filed: Nov. 12, 2009

(65) Prior Publication Data

US 2010/0119890 A1 May 13, 2010

Related U.S. Application Data

(60) Provisional application No. 61/113,966, filed on Nov. 12, 2008.

(51) Int. Cl.
*B01D 53/00* (2006.01)

(52) U.S. Cl. ............... 95/128; 95/139; 96/108
(58) Field of Classification Search ............ 95/39, 128, 95/139; 96/108; 206/6
See application file for complete search history.

(56) References Cited

U.S. PATENT DOCUMENTS 4,770,676 A * 9/1988 Sircar et al. .............. 95/99

* cited by examiner

*Primary Examiner* — Robert A Hopkins
(74) *Attorney, Agent, or Firm* — Procopio, Cory, Hargreaves & Savitch LLP

(57) ABSTRACT

Systems and methods are disclosed herein which produce renewable energy, and reduce greenhouse gas emissions, by transforming biomethane gas into a mobile and renewable energy source. Biomethane gas, in this process, is generated from the anaerobic degradation process that occurs in landfills or other biomethane sources. The biomethane gas, after it has gone through a specialized cleaning system at the biomethane source sites and subsequently transported to gas consumer's customer site or natural gas pipeline, can be used as a substitute for natural gas for use in power generation units, fuel cells, vehicle fuels, and/or other applications.

20 Claims, 4 Drawing Sheets

SYSTEMS AND METHODS FOR BIOMETHANE CLEANING AND DISTRIBUTION

RELATED APPLICATION

This application claims the benefit of U.S. provisional patent application Ser. No. 61/113,966 entitled "BIOMETHANE CLEANING AND DISTRIBUTION," filed on Nov. 12, 2008, which is incorporated herein by reference in its entirety.

FIELD OF THE INVENTION

The present invention generally relates to the field of power generation and relates to biomethane cleaning and distribution for power generation.

BACKGROUND

Traditionally when biomethane is utilized at a landfill, wastewater treatment, and dairy facilities (referred to herein as "biomethane source sites"), the biomethane has been used in power generation units wherein the electricity produced has been sold to the local utility by connecting to a close-by utility line. If biomethane is not used in this fashion, it alternatively has been simply flared off resulting in a wasted renewable energy source or the methane is emitted into the atmosphere creating significant levels of harmful greenhouse gas emissions. Only select types of Sites possess sufficient conditions and scale to justify the fixed costs associated with biomethane-based—biomethane gas to energy power. For example, a landfill located in a remote geographical region, not in close proximity to the electrical grid, would have to incur significant capital costs to connect to the grid, thereby making such projects economically infeasible. Also, the permitting of traditional landfill gas to energy projects has become more stringent as Air Quality Districts and the EPA have made tightened emissions criteria.

SUMMARY

Systems and methods are disclosed herein which produce renewable energy, and reduce greenhouse gas emissions, by transforming biomethane gas into a "mobile and renewable energy source." Biomethane gas, in this process, is generated from the anaerobic degradation process that occurs in landfills or other biomethane sources. The biomethane gas, after it has gone through a specialized cleaning system at the biomethane source sites and subsequently transported to gas consumer's customer site or natural gas pipeline, can be used as a substitute for natural gas for use in power generation units, fuel cells, vehicle fuels, and/or other applications.

According to an embodiment, a method for collecting and distributing biomethane from a biomethane clean-up facility is provided. The method includes drawing raw biomethane from a biomethane source site, and removing contaminants from the raw biomethane to produce purified biomethane. The method further comprises compressing the purified biomethane, storing the compressed biomethane in a pressurized gas storage container, and transporting the pressurized gas storage container with the compressed biomethane from the biomethane source site to a gas consumer, which could include the natural gas pipeline. In an embodiment, the pressurized gas storage container is a tube trailer that meets U.S. Department of Transportation (DOT) requirements for transporting hazardous materials on the U.S. highway system. Additionally, the gas composition being transported meets DOT requirements or has DOT approval.

According to another embodiment, a system for collecting and distributing biomethane from a gas-cleanup facility is provided. The system includes a pressurized gas storage container, a gas clean-up skid, and a tank filling station. The gas clean-up skid is configured to draw raw biomethane gas from a biomethane source, remove contaminants from the raw biomethane to produce purified biomethane, compress the purified biomethane, and store the compressed biomethane in the pressurized gas storage container. The portable transport containers are to be transported to a gas consumer site or natural gas pipeline for use as a fuel source, such as in a compressed natural gas (CNG) filling station, a fuel cell, or a power plant. According to some embodiments, the biomethane source is a solid waste landfill, while in other embodiments, is an anaerobic digester or a wastewater treatment plant. According to an embodiment, the portable gas transport containers are high-pressure tube storage containers designed for transport on a tube trailer.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
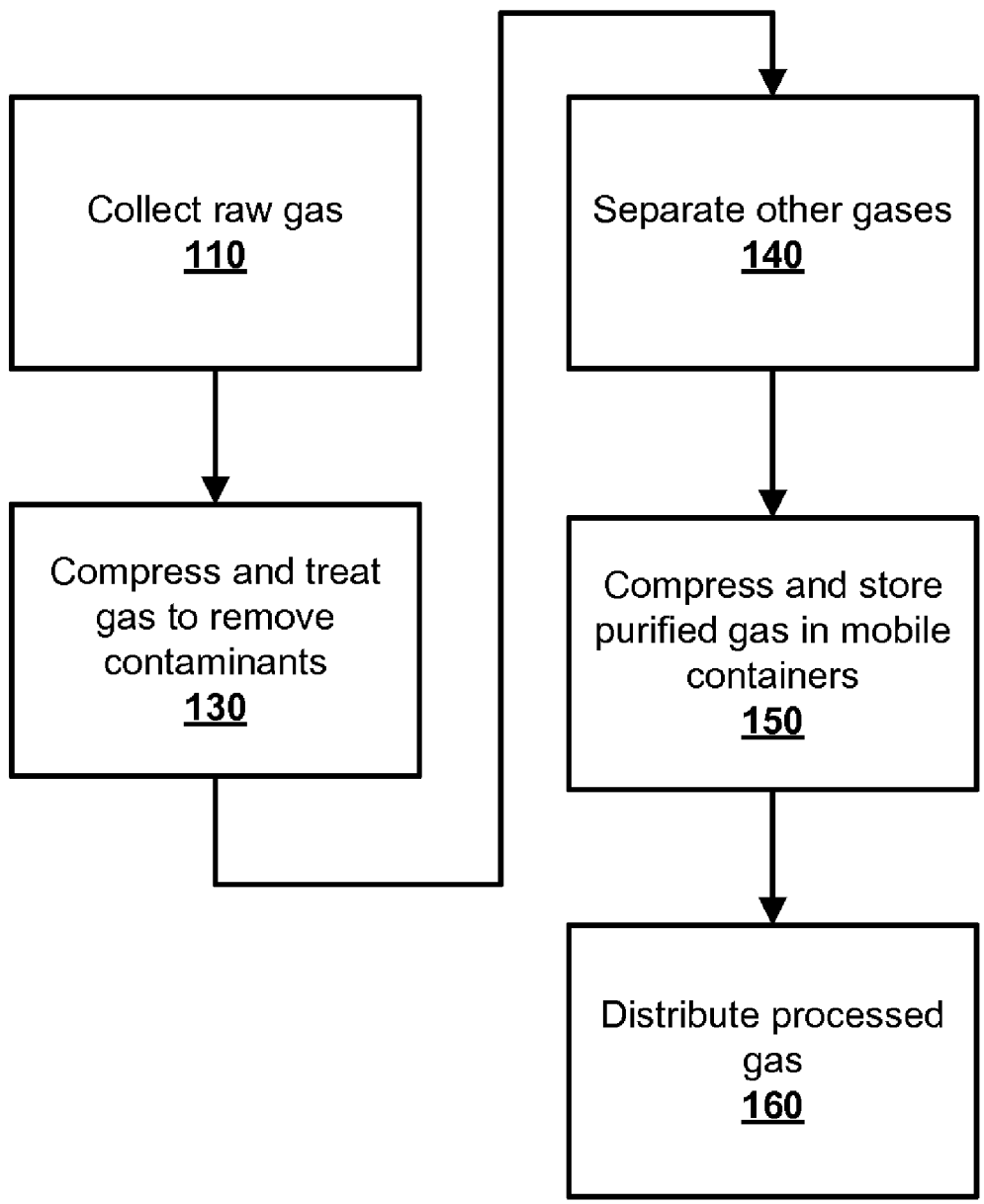
FIG. 1 is a flow diagram of a process for cleaning and distributing biomethane according to an embodiment.

Systems and methods are disclosed herein for producing renewable energy, and reducing greenhouse gas emissions, by transforming biomethane gas into a mobile and renewable energy source. In this process, biomethane gas is generated from the degradation process that occurs at the biomethane source sites. The biomethane gas, after it has gone through a specialized cleaning system at the biomethane source sites and subsequently transported to gas consumer customer sites, can be used as a substitute for natural gas for use in power generation units, fuel cells and/or vehicle fuels. The transported biomethane can also be injected into a natural gas pipeline. While many of the embodiments described herein are directed toward the collection and distribution of biomethane gas from landfills, the systems and methods described herein can also be used with other biomethane sources, such as an anaerobic digester or a wastewater treatment plants.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

One embodiment includes mobilizing condensed and purified biomethane (from landfills) in tube trailer trucks which is then transported to off-site locations for sale to customers who wish to mitigate energy costs while reducing greenhouse gas emissions through the use of renewable energy. For example, the cleaned transported biomethane can be used to power on-site fuel cells, fuel existing power generation units and used as vehicle fuel. The systems and methods disclosed herein allow the landfill to gain significant positive public relations by taking a wasted carbon dioxide producing environmental hazard and turning it into renewable energy that can be re-cycled back into the local community.

In one example, the feedstock supplier is a solid waste landfill. Solid waste landfills are the largest human-generated source of biomethane in America; a fact which, due to biomethane's prominent role in the greenhouse effect, has raised the concerns of governmental authorities. As a result, standards regarding biomethane emissions have become progressively more restrictive, with increased capital cost requirements for biomethane monitoring/gas collection systems hindering the operation of the solid waste landfills and forcing them to explore alternative methods for biomethane disposal. For these facilities, there is a distinct and, increasingly, necessary benefit to allowing biofuel processing entities to install gas collection, purification, and distribution operations at the gas generation site.

One example embodiment includes collecting biomethane from solid waste landfill source sites, purifying and condensing it, and then shipping it, via tube trailers, to customer sites to be used as a displacement for natural gas or other fuels. This same process can be used to inject the purified biomethane into the natural gas pipeline. Tube trailers are designed for shipping tube-shaped high-pressure gas storage containers. Both the tube trailers and the gas composition meet DOT approval and requirements for transporting of hazardous materials. The biomethane product can be used in clean-burning fuel cells producing energy for the customer, input directly into customers existing power generation units and used as vehicle fuel. The result for the customer is cheaper energy costs while reducing greenhouse gas emissions. Thus, renewable energy generation through the use of biomethane becomes a viable solution for customers who never would have considered such since biomethane has historically been used on the gas generation site.

Biomethane Gas Suppliers

Landfills generate a substantial amount of biomethane gas through the anaerobic (oxygen-free) degradation process that occurs naturally within the landfills themselves. According to the U.S. EPA, there are 380 such landfill gas electrification projects in place around the country. Unfortunately, not all landfills are located in areas where the economics of electricity production are sufficient to make landfill gas collection and processing financially feasible (e.g., inadequate electricity prices or access to the electricity grid); therefore, many U.S. landfills do not capture their biomethane. They simply "flare" the gas, or allow it to vent into the atmosphere. Examples of the systems and methods described herein specifically deal with the shortcomings of why certain landfills are unable to economically process the landfill gas into a saleable product. The U.S. EPA estimates that there are more than 560 additional landfills that have the proper characteristics for methane capacity generation in terms of waste-in-place.

Due to increased emission regulations, solid waste landfills will be facing more requirements to collect methane gas and certain restrictions on implementing additional generation systems. The systems and methods described herein are well suited to clean, transport, and use the renewable energy available from biomethane. In other embodiments, the systems and methods described herein can be applied to wastewater treatment plants and other anaerobic digesters.

FIG. 1 is a high level flow diagram of a process for cleaning and distributing biomethane according to an embodiment. The process is implemented at a biomethane source, such as a solid waste landfill, a wastewater treatment plant, or other source where biomethane is produced through anaerobic processes. The raw gas is collected from the biomethane source, and compressed and treated to remove various contaminants (step 130). Additional processing may be performed to remove other gases from the biomethane (step 140), such as carbon dioxide and nitrogen. The purified biomethane gas is then compressed and stored in portable gas storage containers, such as tube trailers (step 150). In an embodiment, the portable gas storage containers and gas composition meet U.S. Department of Transportation (DOT) requirements with regard to hazardous materials safety, federal motor carrier safety, and national highway traffic safety. Tube trailers are one type of gas storage that comprise high-pressure tube storage containers designed for transport on a tube trailer. The portable containers are loaded onto a truck or other transport vehicle as need.

Figure 2:
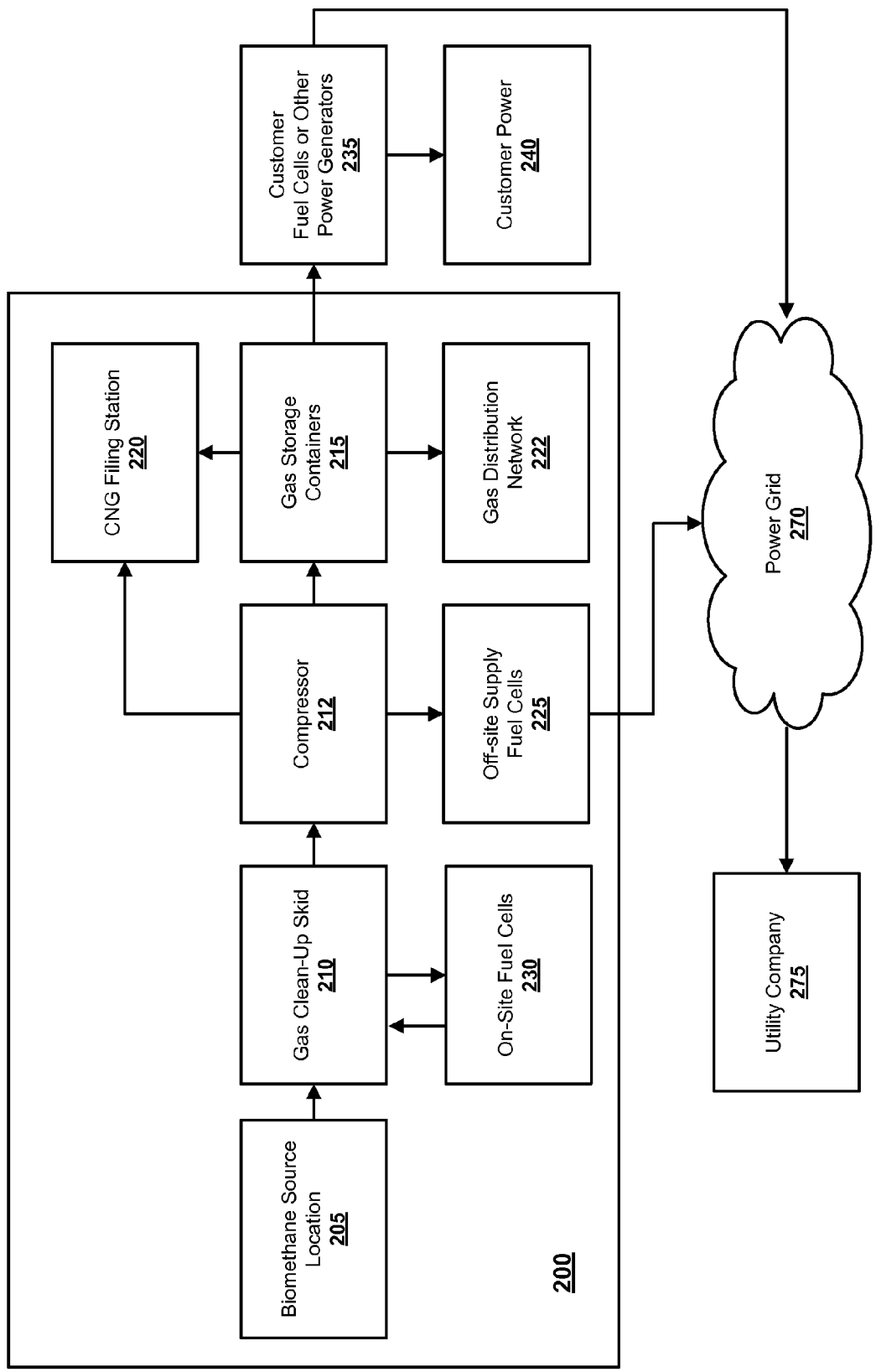
FIG. 2 is a block diagram of a biomethane distribution system according to an embodiment.
Figure 3:
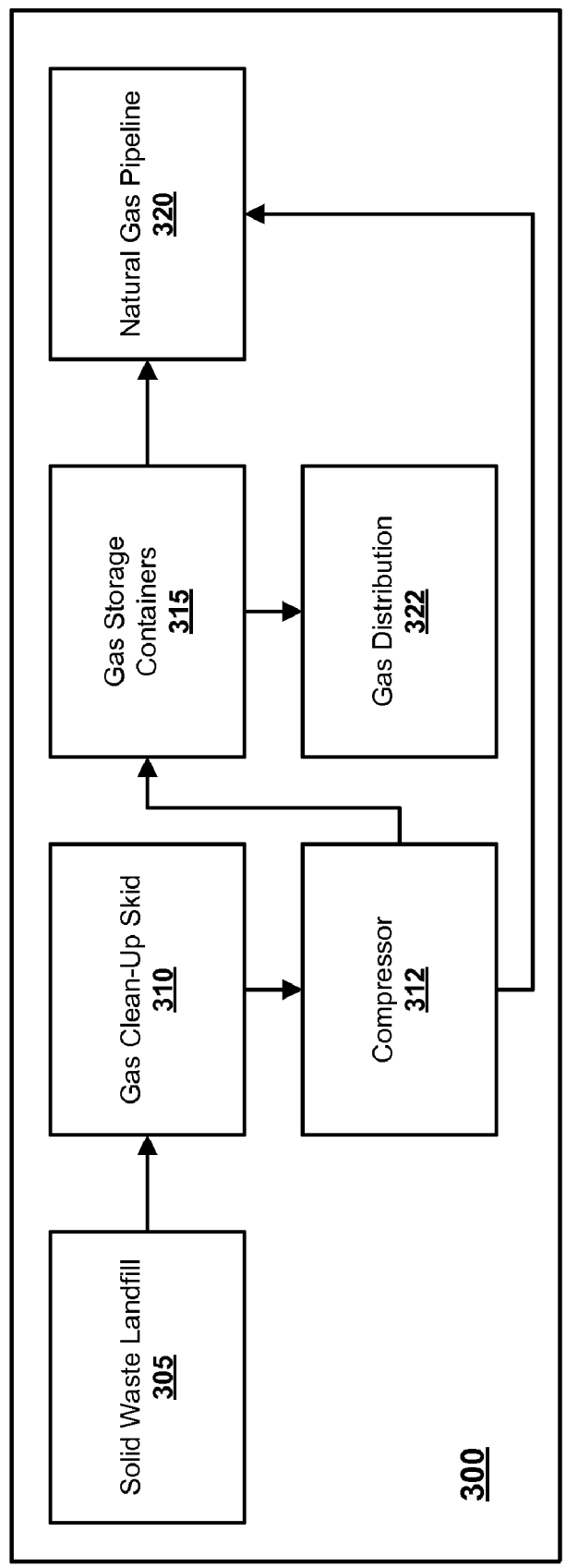
FIG. 3 is a block diagram of another biomethane distribution system according to an embodiment.

The purified gas is then distributed to customer sites for consumption (step 160). The gas may be used to power gas collection equipment at the biomethane site and/or for fueling vehicles used to distribute the purified biomethane to gas consuming customers. The gas can be distributed by filling portable gas transport containers, such as tube trailers, with the purified biomethane for distribution to the customer sites. FIGS. 2 and 3 illustrate two examples of biomethane collection systems that can be used to implement the process illustrated in FIG. 1. One skilled in the art will recognize that other possible configurations are possible.

FIG. 2 is block diagram of a biomethane collection system 200 that can be used to implement the method illustrated in FIG. 1 according to an embodiment. In collection system 200, the biomethane collected and purified at the landfill site is used to generate electricity and to power equipment located at the landfill site. One or more solid waste landfill gas locations 205 are secured. A gas clean-up skid 210 is located on site at the gas source location 205. Landfill gas contains many impurities and therefore requires specialized treatment processes to remove the impurities and increase the methane content. The gas clean-up skid 210 carries out a process of taking raw landfill gas drawn from a well field (at the landfill) under a vacuum. The raw landfill gas is then compressed and treated with media to remove various contaminates, such as sulfur, siloxanes, non-methane organic compounds ("NMOCs"), etc. The purified gas then flows to a carbon dioxide separation process. Depending on the composition of the raw landfill gas, further processing may be performed to remove nitrogen and/or other gases. Other processes to purify or clean the gas can also be employed. The gas is then compressed by compressor 212 and stored in a pressurized gas storage container or containers 215, such as a tube trailer, in preparation of shipping to customer locations. In an embodiment, a portion of the purified biomethane can be used by the on-site fuel cells 230 to generate electricity to power the gas cleanup skid 210 and/or other equipment located at the solid waste landfill site. In an embodiment, a portion of the purified methane can also be provided to fuel cells 225 for generating additional electricity that may be provided to the electrical grid 270 of a utility company 275. The utility company 275 pays for the power generated and distributes the power to utility customers connected to electrical grid 270.

Biomethane from the pressurized gas storage container 215 can also provide compressed natural gas (CNG) to CNG filling station 220. CNG filling station 220 can be used for fueling CNG vehicles. For example, trucks or other vehicles at the landfill site may be powered using the biomethane or vehicles used to distribute CNG to customer sites may also be powered using the biomethane. In an embodiment, CNG filling station 220 may be supplied cleaned biomethane directly after being compressed by compressor 212.

The pressurized gas storage container or containers 215 may also be distributed to gas consumer customer sites via gas distribution network 222. For example, trucks equipped to transport pressurized gas storage containers, such as tube trailers, may be used to transport the cleaned and compressed biomethane. If these trucks are powered by CNG, the trucks can be fueled at CNG filing station 220 using the cleaned biomethane.

According to some embodiments, fuel cells 235 can be located at a customer site. The fuel cells generate electricity that can be provided to the customer power system 240. The electricity provided to the customer power system can then be used to power electrical devices at the customer site. In an embodiment, electricity from fuel cells 235 may also be provided to the electrical grid 270 of a utility company 275.

FIG. 3 is block diagram of another biomethane collection and distribution system 300 that can be used to implement a biomethane collection and distribution process such as that illustrated in FIG. 1 according to an embodiment. In collection and distribution system 300, the biomethane collected and purified at the solid waste landfill site 305 is collected, cleaned by gas clean-up skid 310, compressed by compressor 312, and stored in pressurized gas storage container or containers 315, such as tube trailers, and is delivered to either the natural gas pipeline 320 or the gas distribution network 322.

The gas clean-up skid 310, which operates similarly to the gas clean-up skid 210 described above, carries out a process of taking raw landfill gas drawn from a well field (at the landfill) under a vacuum. The raw landfill gas is processed to remove contaminants and other gases, such as carbon dioxide and nitrogen as described above. In some embodiments, gas clean-up skid 310 can also provide the gas collected to a natural gas pipeline 320 for transporting and distributing natural gas. In an embodiment, compressor 312 compresses the purified gas which is then stored in a pressurized gas storage container or containers 315 similar to the pressurized gas storage container or containers 215 described above. The pressurized gas storage container or containers 315 can then be transported via truck to the natural gas pipeline sites 320. Alternatively, the pressurized gas storage container or containers 315 may also be distributed to gas consumer customer sites via gas distribution network 322, which is similar to the gas distribution network 222 described above.

According to an embodiment, for biomethane transported off of the landfills, customers that fall within approximately 50 miles of that gas source site are secured. These customers each purchase approximately 1 MW of power or gas equivalent, a comparable amount of biomethane gas and/or vehicle fuel. Vehicles then transport the cleaned renewable gas to customers on a daily basis.

The embodiment illustrated in FIG. 3 is referred to herein as a "Mobile Renewable Energy" process, because the vehicles used to deliver the tube trailers or other portable gas transport containers can be powered by the renewable biomethane gas produced by the gas clean-up skid, thereby reducing the reliance on other non-renewable fuel sources and reducing emissions.

According to some embodiments, both electric generation as illustrated in FIG. 2 and CNG distribution as illustrated in FIG. 3 can be provided at the same landfill or other biomethane source if a sufficient supply of biomethane can be extracted from the biomethane source.

Supplier Integration Process

Figure 4:
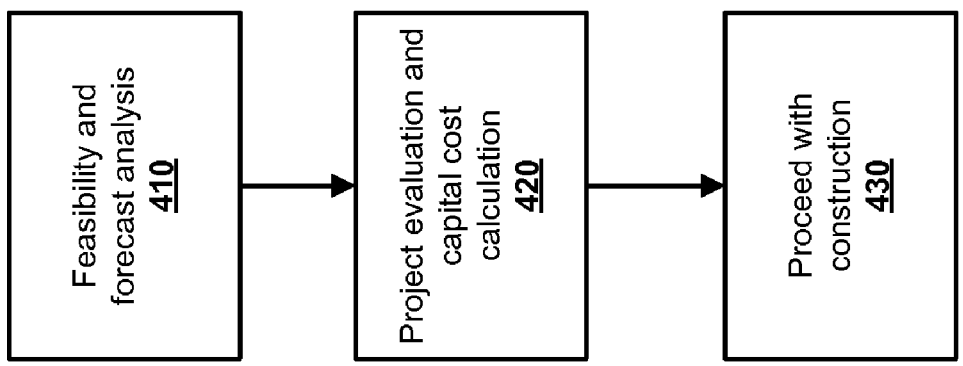
FIG. 4 is a flow diagram of a process for assessing the viability of a biomethane site for use as a biomethane collection and distribution center according to an embodiment.

FIG. 4 is a flow diagram of a process for assessing the viability of a biomethane site for use as a biomethane collection and distribution center according to an embodiment. Before installation at a gas location can occur, a number of feasibility and forecast analyses should be performed (step 410). The first step of this process is to ensure compliance with given protocols of the site and a thorough evaluation of the gas collection system in place at the landfill. The former is to ensure that there are no underlying factors which preclude installation, with the latter to ensure that the project is able to process an adequate product for sale. All gas facilities include a clean-up function within operations at the solid waste landfill facility and fuel cells located on the gas site to provide the parasitic energy to power the gas clean-up skid. Fuel cells produce one of the cleanest energy sources available. The integration of fuel cells at the gas site in conjunction with the option of using clean burning CNG truck tractors to move the purified methane keeps the process a net carbon reduction benefit. Based on governmental subsidies, this use of fuel cells can be very attractive. Assuming that nothing is found in these initial, broad-ranging reports to make further development impossible, the planning and analysis process proceeds. The mobile renewable energy process does not require the use of fuel cells on the biomethane source sites.

Assuming the first calculations provide a go for the project, the next calculation is the project evaluation and capital costs calculation (step 420). This represents a fundamental checkpoint in the planning process, as, from this, the decision will be made whether to abandon the project or to proceed. During this process, customers will be identified based on willingness to enter into a long term power, biomethane gas and/or vehicle fuel purchase agreement. Each customer will purchase approximately 1 MW of electricity, a comparable amount of biomethane gas and/or vehicle fuel. Conversely, if fuel cells are implemented at the landfill site to produce electricity for sale to the electrical grid of a power utility company, the utility would be the customer. If the feasibility studies and the cost calculations work out in favor of construction of the biomethane collection and distribution center, the construction of the biomethane and collection center proceeds (step 430).

Purification, Delivery and Generation Operations

In normal operations, the product will go through distinct steps, beginning at the solid waste facility and ending at the customers' property. In the first stage, the biomethane which has been collected must be purified and compressed. During this process, collected methane gases are purified, where siloxanes, sulfur, nitrogen, carbon dioxide and other impurities such as volatile organic compounds can be minimized as previously described (see FIG. 1, steps 130 and 140). The amount of purification required depends on the biomethane and the desired end use. After purification, the biomethane is compressed to an approximate range of between 2,400-3,600 psi for injection into the tube trailers or portable gas transportation containers (see FIG. 1, steps 150 and 160). Once this process is complete, the transportation phase begins. A small CNG facility station can be provided on the gas site to fill the trucks delivering the biomethane to customers.

In an embodiment, tube trailers are used for transporting biomethane from the supply site to the customer. Purified biomethane is compressed, for efficiency, at the source, and is then placed into high-pressure tube storage containers for short-term storage through use of manifolds. The tube storage containers are loaded on to the tube trailer, and are then driven to the customer's site for use. Once at the site, the high-pressure tube storage container is again connected via manifold to the customer's gas powered energy source and emptied, at which point the driver will drive back to the biomethane supply source where the high-pressure tube storage containers can be refilled.

This distribution process is also quite safe, as the tube trailers hold specially designed, heavy-walled gas storage tubes, created for the transportation of gas products, such as helium, hydrogen, oxygen, nitrogen, over the road. One of the unique aspects of the Mobile Renewable Energy Process described herein is transporting landfill gas, over the road, for usage by off-site customers and or put into the natural gas pipeline. The United States Department of Transportation (DOT) has a strict set of criteria for transporting gases in tube trailers, and each vehicle is tested to ensure that it meets the stringent DOT standards.

Customers will have power generation equipment, fuel cells and/or vehicle fuel usage at their site and therefore, it is into this energy unit that the purified biomethane is unloaded, again through a manifold system.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for collecting and distributing biomethane from a biomethane clean-up facility, the method comprising:
   drawing raw biomethane from a biomethane source site;
   removing contaminants from the raw biomethane to produce purified biomethane;
   compressing the purified biomethane;
   storing the compressed biomethane in a pressurized gas storage container;
   transporting the pressurized gas storage container with the compressed biomethane from the biomethane source site to a gas consumer site.

2. The method of claim 1 wherein the portable gas transportation containers comprise high-pressure tube storage containers designed for transport on a tube trailer.

3. The method of claim 1 wherein the compressing the purified biomethane further comprises compressing the purified biomethane to a pressure in the range of 2,000 pounds per square inch (psi) to 3,600 psi.

4. The method of claim 1, further comprising:
   fueling a vehicle to be used for transporting the portable gas containers to the consumer site with cleaned compressed biomethane.

5. The method of claim 1, further comprising:
   supplying a portion of the compressed biomethane from the biomethane clean-up facility to a fuel cell to generate electricity using the biomethane.

6. The method of claim 5, further comprising:
   routing at least a portion of the electricity generated by the fuel cell to an electric grid operated by a utility company.

7. The method of claim 5, further comprising:
   routing at least a portion of the electricity generated by the fuel cell to power a gas clean-up skid for drawing the raw biomethane from the biomethane source.

8. The method of claim 1 wherein the biomethane source is a solid waste landfill.

9. The method of claim 1 wherein the biomethane source is an anaerobic digester.

10. The method of claim 1 wherein the biomethane source is a wastewater treatment plant.

11. The system of claim 10 wherein the pressurized gas storage container comprises a tube trailer.

12. The system of claim 10 wherein the gas clean-up skid is configured to compress the purified biomethane to a pressure in the range of 2,000 pounds per square inch psi to 3,600 psi.

13. The method of claim 1, further comprising:
   a fuel cell configured to receive compressed biomethane from the pressurized gas storage container and to use the compressed biomethane to generate electricity.

14. The system of claim 13 wherein the system is further configured to route at least a portion of the electricity generated by the fuel cell to an electric grid operated by a utility company.

15. The system of claim 13 wherein the system is further configured to route at least a portion of the electricity generated by the fuel cell to power the gas clean-up skid for drawing the raw biomethane from the biomethane source.

16. The system of claim 10 wherein the biomethane source is a solid waste landfill.

17. The system of claim 10 wherein the biomethane source is an anaerobic digester.

18. The system of claim 10 wherein the biomethane source is a wastewater treatment plant.

19. A system for collecting and distributing biomethane from a gas-cleanup facility comprising:
   a pressurized gas storage container;
   a gas clean-up skid configured to draw raw biomethane from a biomethane source;
   remove contaminants from the raw biomethane to produce purified biomethane;
   compress the purified biomethane; and
   store the compressed biomethane in the pressurized gas storage container, the pressurized gas storage container to be transported to a gas consumer site.

20. The system of claim 19, further comprising:
   a fueling station for fueling a vehicle to be used for transporting the pressurized gas storage container to the consumer site with compressed biomethane stored in the storage facility.

* * * * *